(12) United States Patent
Piestert

(10) Patent No.: US 12,066,013 B2
(45) Date of Patent: Aug. 20, 2024

(54) METHOD FOR PERFORMING WORKING USING OSMOSIS

(71) Applicant: Oliver Piestert, Goslar (DE)

(72) Inventor: Oliver Piestert, Goslar (DE)

( * ) Notice: Subject to any disclaimer, the term of this patent is extended or adjusted under 35 U.S.C. 154(b) by 0 days.

(21) Appl. No.: 17/906,571

(22) PCT Filed: Mar. 17, 2021

(86) PCT No.: PCT/EP2021/056807
§ 371 (c)(1),
(2) Date: Sep. 16, 2022

(87) PCT Pub. No.: WO2021/185900
PCT Pub. Date: Sep. 23, 2021

(65) Prior Publication Data
US 2023/0133424 A1 May 4, 2023

(30) Foreign Application Priority Data

Mar. 20, 2020 (EP) .................................. 20164659

(51) Int. Cl.
*F03G 7/00* (2006.01)
*B01D 61/08* (2006.01)

(52) U.S. Cl.
CPC ............. *F03G 7/015* (2021.08); *B01D 61/08* (2013.01)

(58) Field of Classification Search
CPC . F03G 7/005; F03G 7/015; F03G 7/04; B01D 61/002; B01D 61/025; B01D 61/06; B01D 61/08; B01D 2313/246
See application file for complete search history.

(56) References Cited

U.S. PATENT DOCUMENTS 3,386,912 A * 6/1968 Lazare ................ B01D 61/002
  210/321.71
5,364,525 A * 11/1994 Hagqvist ................ B01D 61/04
  210/275

(Continued)

FOREIGN PATENT DOCUMENTS

JP  2006-528740 A  12/2006
JP  2009047012 A  3/2009

(Continued)

OTHER PUBLICATIONS

International Search Report and Written Opinion in corresponding International Application No. PCT/EP2021/056807 dated Jun. 14, 2021.

(Continued)

*Primary Examiner* — Loren C Edwards
(74) *Attorney, Agent, or Firm* — Westman, Champlin & Koehler, P.A.

(57) ABSTRACT

The present application relates to a method and a motor for performing work using osmosis. The method comprises the steps of providing a motor comprising a supply chamber, a pressure chamber comprising at least one inlet and at least one outlet, and a membrane permeable to fluid and at least partially impermeable to salt ions and enabling fluid communication between the supply chamber and the pressure chamber; then providing low salt concentration fluid in the supply chamber, closing the outlet of the pressure chamber; flowing high salt concentration fluid into the pressure chamber; allowing the pressure within the pressure chamber to increase as fluid crosses the membrane into the pressure chamber and using the increased pressure within the pressure chamber to perform work; then opening the outlet of the pressure chamber and allowing the fluid to drain from the pressure chamber and the pressure in the pressure chamber to decrease.

33 Claims, 3 Drawing Sheets

(56) References Cited

U.S. PATENT DOCUMENTS

| | | | | |
|---|---|---|---|---|
| 2009/0071902 A1* | 3/2009 | Stover | .................... | B01D 61/10 |
| | | | | 210/637 |
| 2009/0173691 A1* | 7/2009 | Oklejas, Jr. | ............. | C02F 1/441 |
| | | | | 210/97 |
| 2014/0007564 A1 | 1/2014 | Efraty | | |
| 2018/0085708 A1 | 3/2018 | Sakai et al. | | |

FOREIGN PATENT DOCUMENTS

| | | | | |
|---|---|---|---|---|
| JP | 2009-536878 A | 10/2009 | | |
| JP | 2014-101818 A | 6/2014 | | |
| JP | 2016-514035 A | 5/2016 | | |
| JP | 2017-042702 A | 3/2017 | | |
| KR | 101067422 B1 | 9/2011 | | |
| KR | 101239440 B1 * | 3/2013 | ............... | F03G 7/04 |
| KR | 101239440 B1 | 3/2013 | | |
| WO | 2011064252 A1 | 6/2011 | | |
| WO | 2014125405 A1 | 8/2014 | | |
| WO | WO-2014125405 A1 * | 8/2014 | ........... | B01D 61/002 |

OTHER PUBLICATIONS

Office Action in corresponding Chilean Patent Application No. 202202545 dated Sep. 28, 2023.

Office Action in corresponding Japanese patent application No. 2022-556627 dated Nov. 7, 2023 and corresponding search report dated Oct. 20, 2023.

* cited by examiner

METHOD FOR PERFORMING WORKING USING OSMOSIS

CROSS-REFERENCE TO RELATED APPLICATION(S)

This application is a Section 371 National Stage Application of International Application No. PCT/EP2021/056807, filed Mar. 17, 2021 and published as WO 2021/185900 A1 on Sep. 23, 2021, in English, and further claims priority to European Application Ser. No. 20164659.3 filed Mar. 20, 2020.

BACKGROUND

The invention relates to a method for performing work using osmosis and to an osmotic motor.

In recent years the demand for clean energy production has grown exponentially. Many different renewable energy sources, such as solar energy and wind energy are being implemented to gradually shift economic dependence away from non-renewable energy sources. Another type of renewable energy source, namely, energy production from osmotic gradients, has thus far been under-utilized as a part of the energy transition.

The concept of osmotic motors or osmotic energy production has been known and even implemented in various configurations. A strategic location for osmotic energy production is the connection point between a river and a body of salt water, i.e. a river mouth. Such locations provide an abundant and continuously replenished supply of both fresh water and salt water. Thus, natural mixing of salt water and fresh water at river mouths takes place continuously. However, this osmotic mixing process cannot yet be controlled in such a way that a sufficiently reliable and strong supply of energy arises therefrom.

In contrast with other clean energy sources, such as sun and wind, osmotic mixing of salt and fresh water takes place continuously and is largely independent of weather conditions. Thus, osmotic energy production provides the benefit of a steady stream of reliable energy that can complement other clean energy technologies.

However, certain limitations of known methods have provided a challenge for increasing the efficiency of osmotic energy production and have thus far lead to under-utilization of this advantageous technology.

For example, US 2018/0085708 A1, US 2014/0007564 A1, KR 101239440 B1 and WO 2011/064252 A1 suggest specific concepts of osmotic energy production. These concepts are based on pressure retarded osmosis, i.e. on maintaining specific, elevated pressure conditions. However, these concepts may be disadvantageous in terms of net energy production.

Disclosed embodiments of the present invention to provide a method for performing work using osmosis and to provide an osmotic motor which address current limitations of this technology.

SUMMARY

According to a first aspect, the invention relates to a method for performing work using osmosis comprising the steps of
i) providing a motor comprising a supply chamber, a pressure chamber comprising at least one inlet and at least one outlet, and a membrane permeable to fluid, preferably water, and at least partially impermeable to salt ions, the membrane enabling fluid communication between the supply chamber and the pressure chamber;
ii) providing low salt concentration fluid, preferably low salt concentration water, in the supply chamber;
iii) closing the at least one outlet of the pressure chamber;
iv) flowing high salt concentration fluid, preferably high salt concentration water, into the pressure chamber;
v) allowing the pressure within the pressure chamber to increase as fluid crosses the membrane into the pressure chamber;
vi) using the increased pressure within the pressure chamber to perform work;
vii) opening the at least one outlet of the pressure chamber and allowing the fluid to drain from the pressure chamber and the pressure in the pressure chamber to decrease;
viii) repeating steps iii to vii.

Preferably, the at least one outlet is sealed in step iii).

Preferably, the steps iv), v), vi) are performed sequentially and preferably in this order.

Preferably, the motor further comprises a turbine. Thus, step vi may further comprise flowing fluid out from the pressure chamber due to increased pressure and allowing the fluid to operate the turbine to perform work. A turbine provides a direct way to convert the pressured flow into electricity such as in hydroelectric power systems. The pressure chamber may have a fixed volume for this purpose.

Alternatively, the pressure chamber may comprise a variable volume, preferably wherein the pressure chamber further comprises a piston. In such a configuration the expansion and contraction of the pressure chamber, through, for example, movement of the piston, may be used to perform work.

Preferably the at least one outlet comprises a valve, wherein the method further comprises the steps of opening the valve to relieve at least a portion of the pressure within the pressure chamber, wherein the flow of fluid emitted from the valve is used to perform work. Flow through the valve preferably is intermittent. In other words, the fluid may be intermittently emitted from the pressure chamber to perform work.

In other words, a flow of fluid emitted from the pressure chamber in order to perform work (e.g., for generating electric energy in a generator) may be intermittent.

More preferably the valve is a non-return valve. A valve, and especially an overpressure and/or non-return valve, may assist in preventing backflow into the pressure chamber. The valve may be configured to open once a predetermined pressure is reached, in particular once a predetermined pressure is reached within the pressure chamber. The valve may be fully mechanical for this purpose. Alternatively, one or more pressure sensors may be provided in order to measure whether the predetermined pressure is reached, upon which the valve may be opened (e.g., by an electrical control unit).

The motor may comprise at least one accumulator, in particular at least one hydraulic accumulator. Such hydraulic accumulator may be helpful, for example, when the fluid is intermittently emitted from the pressure chamber to perform work. In particular, such accumulator may allow to maintain the pressure supplied to the turbine within a desired range, despite the intermittent fluid supply from the pressure chamber. The accumulator may be interposed between the pressure chamber and the turbine.

The method may further comprise the step of building up and maintaining a certain level of pressure in the outflow resulting from the pressure chamber by means of the accumulator. In other words, the accumulator may receive the outflow from the pressure chamber, build up pressure, and maintain a certain level of pressure in the outflow from the accumulator, which is then used to perform work (e.g., via the turbine). Accordingly, the accumulator may be configured to build up and maintain a certain level of pressure.

The at least one outlet may be provided by at least one outflow port of the pressure chamber.

The at least one outlet of the pressure chamber may include at least one first outlet and at least one second outlet. The at least one first outlet may be formed as at least one first outflow port of the pressure chamber and the at least one second outlet may be formed as at least one second outflow port of the pressure chamber. Alternatively, the at least one first outlet and the at least one second outlet may be connected to the pressure chamber via a common outflow port, if desired. For example, the at least one first outlet and the at least one second outlet could also be provided by a fluid valve having at least one inlet and at least two outlets (e.g., a dual outlet valve or a three-way valve). In any case, the at least one second outlet may also be referred to as a "secondary outlet" or "secondary outlet port" hereinafter.

When at least one first outlet and at least one second outlet is provided, the increased pressure within the pressure chamber that is used to perform work may be released through the at least one second outlet (e.g., the at least one secondary outlet port). Step vi) may thus include utilizing a high pressure flow through the at least one second outlet to perform the work. Accordingly, the method for performing work using osmosis may comprise a step of opening the at least one second outlet to emit high pressure flow through the at least one second outlet to perform the work. The second outlet may be closed and/or sealed during step v).

When the at least one first outlet and at least one second outlet is provided, the at least one first outlet may allow to drain fluid from the pressure chamber, for example to drain fluid that is not intended to be used for performing work. In other words, fluid draining from the pressure chamber via the at least one first outlet may bypass work harvesting and power generation. Accordingly, the method for performing work using osmosis may comprise a step of opening the at least one first outlet, thereby draining fluid from the pressure chamber. The first outlet may be closed and/or sealed during step v). The first outlet may be closed and/or sealed during step vi).

The at least one first outlet and the at least one second outlet may each be provided with a respective closeable and/or sealable valve (e.g., an overpressure and/or non-return valve).

The at least one first outlet and the at least one second outlet may each be provided with a respective closeable and/or sealable valve (e.g., overpressure and/or non-return valve, or an electrically actuated valve), as described above. Closing and/or sealing the respective outlet may thus comprise closing the respective valve.

Preferably, the steps iii to viii are repeated at least 2 times per hour, more preferably at least 10 times per hour, more preferably at least 20 times per hour, and even more preferably at least 60 times per hour. This allows providing an adequate intermittent flow through such valve and/or an adequate intermittent movement of such piston to perform work.

Preferably, the at least one inlet is at least one inflow port.

Preferably the motor further comprises an osmotic barrier configured to reversibly block the exchange of fluid between the supply chamber and the pressure chamber. The method may further comprise the steps of positioning the osmotic barrier over the membrane such that the fluid flow between the supply chamber and the pressure chamber is prevented, and removing the osmotic barrier after using the increased pressure to perform work. An osmotic barrier may help to separate the replenishment of the high salt concentration fluid within the pressure chamber and the buildup of pressure within the pressure chamber.

It is preferred that during filling of the pressure chamber by fluid crossing the membrane (step v) a maximum pressure achieved within the pressure chamber is at least 0.3 MPa relative to atmospheric pressure (also referred to as "gauge"), more preferably at least 1.3 MPa (gauge), and even more preferably at least 3 MPa (gauge) or at least 4 MPa (gauge). This pressure may be lower than a maximum theoretical osmotic pressure as the amount of water flowing through the membrane is proportional to the maximum theoretical osmotic pressure minus pressure in the pressure chamber. It is preferred that the pressure in the pressure chamber during energy generation is at least 10% lower, more preferred at least 25% lower, most preferred at least 50% lower than the maximum theoretical osmotic pressure of the system.

It is also preferred that flowing of low salt concentration fluid into the supply chamber is performed while the pressure chamber is either empty or at a pressure lower than 1 MPa (gauge), more preferably lower than 100 kPa (gauge), more preferably lower than 1.0 kPa (gauge), or even at atmospheric pressure.

It is preferred that during the flowing of high salt concentration fluid into the pressure chamber in step iv the pressure in the pressure chamber is lower than 1 MPa (gauge), lower than 100 kPa (gauge), or even lower than 1.0 kPa (gauge), or even at atmospheric pressure.

Alternating between a low pressure for chamber filling and a higher pressure for performing work may help in achieving higher efficiency of the osmotic motor system. It may require none or less work to introduce the high salt concentration fluid into the pressure chamber and/or improve the flow of fluid through the membrane at the beginning of step v, since flow through the membrane tends to be higher when the pressure difference between the chambers is small. Particularly, the motor may alternate between a lower pressure for chamber filling and a higher pressure during which fluid crosses the membrane, either in the pressure chamber or the supply chamber or in both chambers. The pressure chamber may alternate between the lower pressure for chamber filling and the higher pressure during which fluid crosses the membrane at least 2 times per hour, more preferably at least 10 times per hour, more preferably at least 20 times per hour and even more preferably at least 60 times per hour. The higher pressure in the pressure chamber preferably results from the fluid that enters the pressure chamber by crossing the membrane.

Preferably the method further comprises the step of sealing the inlet (e.g., the inflow port) of the pressure chamber after flowing high salt concentration fluid into the pressure chamber. Sealing the inlet (e.g., the inflow port) may promote a reliable and reproducible buildup of pressure within the pressure chamber.

Preferably the low salt concentration fluid has a salt concentration below 5 parts per thousand, more preferably below 1 part per thousand, and even more preferably below 0.5 parts per thousand. Similarly, it is preferred that the high salt concentration fluid has a salt concentration above 5 parts per thousand, more preferably above 20 parts per thousand, and even more preferably above 30 parts per thousand. In relation to one another it is preferred that the high salt concentration fluid has a salt concentration at least 100 times higher than the low salt concentration fluid, more preferably at least 500 times higher and even more preferably at least 1000 times higher. A high osmotic gradient between the low salt concentration side and the high salt concentration side of the membrane enables more work to be performed.

An inclination and/or height difference may be employed for creating a current and/or pressure that flows the low salt concentration fluid into the supply chamber and/or the high salt concentration fluid into the pressure chamber. Such current or pressure preferably is created without the use of electrical energy (e.g., without the use of pumps) and/or without the use of mechanical energy (e.g., without the use of mechanical energy created by the motor). For example, a naturally occurring current or pressure is employed for flowing the low salt concentration fluid into the supply chamber and/or the high salt concentration fluid into the pressure chamber. For example, it is preferred that the low salt concentration fluid flows into the supply chamber by gravity and/or that the high salt concentration fluid flows into the pressure chamber by gravity. Similarly, it is preferred that the fluid is drained from the pressure chamber by gravity. Using a gradient or pressure to flow fluid through the osmotic motor system reduces the amount of energy input required and consequently enhances the overall efficiency of the method.

Preferably the high salt concentration fluid is sea water, wastewater or brine, wherein the brine preferably results from a desalination process, such as reverse osmosis, an evaporation process or a condensation process. Preferably the low salt concentration fluid is fresh water from a river. Such fluid sources are readily found worldwide and promote the usability of the osmotic motor system.

Preferably the pressure in the pressure chamber decreases as the fluid from the pressure chamber is drained. Preferably the pressure in the pressure chamber decreases as work is performed.

The supply chamber may remain filled through two, five, ten, twenty or more repetitions of steps iii to vii. In order to compensate for fluid crossing into the pressure chamber, low salt concentration fluid may be added to the supply chamber as required.

Preferably, pressure built up within the pressure chamber during step v takes place in less than 15 minutes, more preferably in less than 10 minutes, end even more preferably in 5 minutes or less.

When repeating steps iii to vii, the replenishment of the pressure chamber with new high salt concentration fluid in steps vii and iii takes place in less than 3 minutes, preferably less than 2 minutes, more preferably less than 1 minute or less than 0.5 minutes.

According to a second aspect the invention relates to a motor comprising:
a supply chamber configured to receive a supply of low salt concentration fluid, preferably low salt concentration water;
a pressure chamber configured to receive a supply of high salt concentration fluid, preferably high salt concentration water, the pressure chamber further comprising at least one inlet and at least one closeable outlet;
a membrane permeable to fluid molecules and at least partially impermeable to salt ions, the membrane enabling fluid communication between the supply chamber and the pressure chamber, wherein the pressure chamber is configured to alternate between a closed configuration, wherein the at least one closable outlet is closed and pressure builds within the pressure chamber, and an open configuration, in which the at least one closable outlet is open and pressure within the pressure chamber reduces.

The motor may be used in the above-mentioned method. The features of the motor may translate to features of the method and vice-versa.

The at least one outlet may be at least one outflow port. The at least one outlet may be sealable. In particular, the at least one outflow port may be sealable.

The at least one inlet may be at least one inflow port.

The motor may be configured for performing work. Particularly, the motor may be configured for using the increased pressure that is generated within the pressure chamber to perform work.

Preferably the motor further comprises a generator and/or turbine in fluid connection with the pressure chamber. In this case, the pressure chamber may have a fixed volume.

In another configuration, it is preferred that the pressure chamber has a variable volume. Preferably such pressure chamber further comprises an expansion portion configured to allow the pressure chamber to reversibly increase in volume. More preferably the expansion portion of the pressure chamber is a piston.

Preferably the motor further comprises an osmotic barrier configured to reversibly block the exchange of fluid between the supply chamber and the pressure chamber through the membrane.

An osmotic barrier allows for the build of pressure in the pressure chamber to be controlled and possibly to only take place during certain phases of the motor work cycle.

Preferably the pressure chamber further comprises a valve configured to release fluid from the pressure chamber. More preferably the valve is an overpressure and/or a non-return valve, as discussed above.

It is preferred that the osmotic membrane provides a stabilized salt rejection of at least 95%, more preferably at least 98%, and even more preferably at least 99% when subjected to a test salt concentration of 32.000 mg/L NaCl at 25° C. with an applied pressure of 5.5 MPa, and with 10% recovery. The efficacy of the membrane is related to the speed of pressure build up within the pressure chamber and the overall total pressure within the pressure chamber that can be achieved. Higher salt rejection leads to faster speeds and overall higher achievable pressures.

Preferably the supply chamber further comprises at least one inlet (e.g., at least one inlet port) and at least one outlet (e.g., at least one outlet port), preferably wherein the inlet (e.g., the inlet port) and/or the outlet (e.g., the outlet port) is sealable. Sealable ports on the supply chamber promote a motor system wherein the supply chamber is filled in a stepwise and/or intermittent manner.

Preferably the motor is configured to provide at least 100 Watts of energy, more preferably at least 1 Kilowatts, and even more preferably at least 1 Megawatt of energy.

Preferably in the closed configuration of the pressure chamber a maximum pressure achieved within the pressure chamber is at least 1 MPa, more preferably at least 2 MPa, and even more preferably at least 2.3 MPa. Higher maximum pressures enable a greater amount of work to be performed by the motor.

Preferably in the open configuration of the pressure chamber a minimum pressure achieved within the pressure chamber is at most 1 MPa, more preferably at most 100 kPa, and even more preferably at most 1.0 kPa. Low pressure during filling of the chamber allows for quicker filling and replenishment of high salt concentration fluid.

The invention may also relate to a system comprising the above-described motor and a generator for producing electric energy. Such generator may comprise a turbine. The motor may be configured to carry out the above-described method.

According to the invention, the motor, or a system comprising such motor, may also comprise a plurality of pressure chambers. All pressure chambers may be connected, via one, a plurality of or a corresponding number of osmotic membranes, to a single (i.e. the same) supply chamber. Alternatively, the plurality of pressure chambers may be connected via one osmotic membrane, a plurality of or a corresponding number of osmotic membrane elements, to a plurality of supply chambers. e.g. a corresponding number of supply chambers. A plurality of pressure chambers has the advantage that during the time in which no energy is produced in one pressure chamber, another pressure chamber may produce energy. Furthermore, the amount of energy produced during a cycle is decreasing as fresh water is diluting the salt water in a pressure chamber. In case a cycle takes a few minutes, the plurality of pressure chambers enables an operation mode in which every few seconds a new cycle starts.

The one or the plurality of pressure chambers may be connected to one or a plurality of turbines/generators. Accordingly, the above-described motor/system may also comprise a plurality of turbines and/or generators. A plurality of turbines and/or generators enables a greater adaptability of the system to a varying demand for current. For example, the number of turbines/generators that produce current may be varied according to the demand for current.

Accordingly, the method described above may be adapted to the motor with a plurality of pressure chambers. For example, the method steps described herein may be applied to any of the plurality of pressure chambers, alone or in parallel with other pressure chambers of the plurality of pressure chambers. If the method steps are applied to several pressure chambers, the method steps applied to one pressure chamber may be shifted in time as compared to one or several or all other pressure chambers.

It is also contemplated that several motors run in parallel.

The present summary is provided only by way of example and not limitation. Other aspects of the present invention will be appreciated in view of the entirety of the present disclosure, including the entire text, claims and accompanying figures.

BRIEF DESCRIPTION OF THE DRAWINGS

The invention will be explained in more detail in the following text with reference to preferred exemplary embodiments which are illustrated in the appended drawings, in which:

FIG. 2a schematically illustrates an alternative configuration of the motor in which the pressure chamber comprises a piston, an inlet of the pressure chamber being in an open configuration as high salt concentration water is flowed in;

Figure 1A:
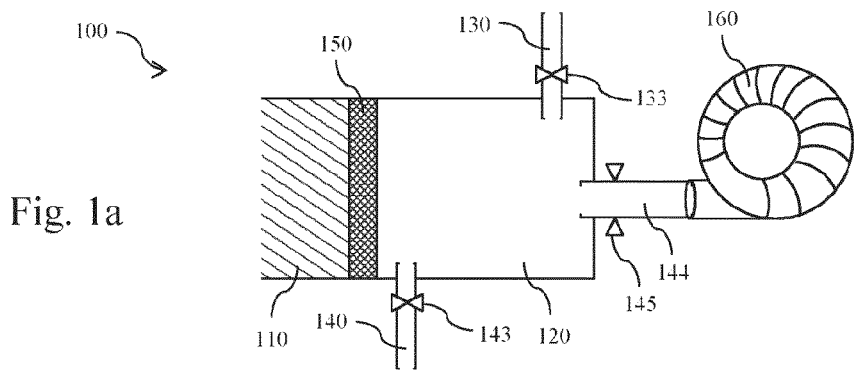
FIG. 1a schematically depicts a pressure chamber in a low pressure configuration.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps, and/or components not specifically shown in the drawings.

DETAILED DESCRIPTION

In the following discussion of the inventive method and motors the terms "fresh water" and "salt water" will be used merely out of convenience. Nevertheless, the principles of osmotic pressure, osmotic gradient, and the functioning of an osmotic motor are not dependent on the specific use of fresh water and salt water. These terms are to be understood as being short-hand for a liquid containing a low solute concentration (fresh water) and a liquid containing a high solute concentration (salt water). The liquid in use may be any liquid and the solute in use may be any substance dissolvable in the liquid given the constraint that a suitable membrane can be implemented which is capable of separating the liquid from the solute. In fact, the exact concentration of solutes in fresh water and salt water can vary between locations and the solutes implied in fresh water and salt water include numerous components that will later be discussed in more detail.

FIG. 1 conceptually illustrates the steps of extracting work using an osmotic gradient according to the present invention. In FIG. 1a, a simplified example of an osmotic motor is outlined. The motor 100 includes a supply chamber 110, a pressure chamber 120 having at least one inlet 130 (exemplified here as an inflow port) and at least one outlet, and an osmotic membrane 150. The outlet may comprise at least one first outlet 140 (exemplified here as an outflow port 140) and, optionally, at least one second outlet 144 (exemplified here as a secondary outlet port 144).

The supply chamber 110 is configured to receive a liquid supply having a low solute concentration, such as fresh water. The extent of the supply chamber 110 is not entirely depicted within FIG. 1a and can be adapted in size and shape to suit the needs of the motor.

Adjacent the supply chamber 110 is the pressure chamber 120, which is configured to receive a liquid supply having a high solute concentration, such as salt water. The pressure chamber 120 as depicted in this example has a defined volume, this volume being related to the amount of work the can be performed, i.e. the amount of energy that can be extracted from the motor.

On one side of the pressure chamber 120 is positioned the inlet 130. The inlet 130 allows for the inflow of salt water into the pressure chamber 120. The pressure chamber 120 further comprises the at least one first outlet 140, which allows the fluid to later drain out of the pressure chamber 120. The first outlet 140 preferably is positioned below the inlet 130, for example on another side of the pressure chamber 120 than the inlet 130, more preferably on the opposite side of the pressure chamber 120 than the inlet 130. The first outlet 140 may further comprise a valve 143, which may be operated to either hold the fluid within the pressure chamber 120 and thereby help to build up pressure and/or to drain the pressure chamber 120 and reduce pressure. As such, the valve 143 may also be referred to as a first pressure chamber outlet valve.

Preferably, a valve 133 is provided to close the inlet 130 (e.g., the inlet port). As such, the valve 133 may also be referred as a pressure chamber inlet valve.

In between the supply chamber 110 and the pressure chamber 120 the osmotic membrane 150 is positioned, which is permeable to the liquid in the supply chamber 110 and at least somewhat impermeable to the solute within the pressure chamber 120. The membrane 150 should form a connection between the supply chamber 110 and the pressure chamber 120 through which the liquid can cross. It is preferred that no other channels without such membrane exist to communicate fluid between the supply chamber 110 and the pressure chamber 120 in order to allow osmosis to occur at the membrane.

As an initial step, fresh water is provided into the supply chamber 110 as shown in FIG. 1a. This step may be performed either as a distinct filling step or, alternatively, fresh water may be continuously supplied or flowed through the supply chamber 110. If the fresh water is supplied in a separate step, it is preferred that at least the inlet 130 of the pressure chamber 120 is closed and/or sealed, e.g. by closing the pressure chamber inlet valve 133. Preferably, the outlet 140 is closed and/or sealed as well. e.g. by closing the first pressure chamber outlet valve 143.

As the work will be used that is generated during filling, it is preferred to first fill the pressure chamber 120, close the pressure chamber inlet valve 133, and then fill the supply chamber 110. Since it is not necessary to drain the supply chamber 110 in every cycle, it is also possible to fill the pressure chamber 120 while the supply chamber 110 remains at least partially filled (e.g., at least 50% filled) or entirely filled.

Figure 1B:
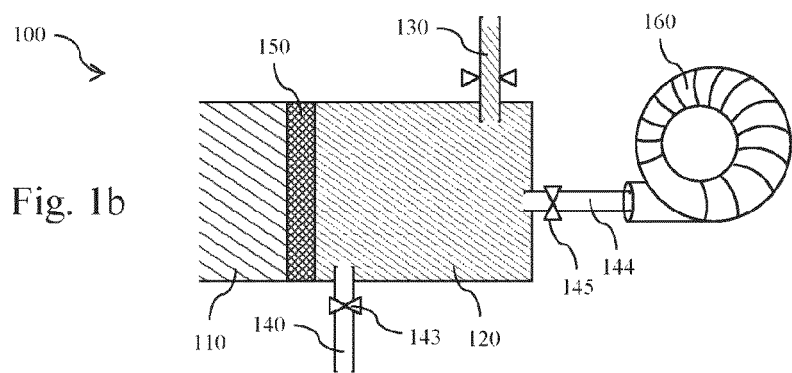
FIG. 1b schematically depicts the pressure chamber being filled with high salt concentration fluid in the low pressure configuration.

A shown in FIG. 1b, the outlet 140 of the pressure chamber 120 is closed and/or sealed and the inlet 130 is opened such that salt water flows into the pressure chamber 120. In the illustrations provided the density of cross-hatching is intended to illustrate the concentration of solute within the liquid (not to scale). Thus, it is clear that the liquid in the pressure chamber 120 at this point has a higher solute concentration than the liquid in the supply chamber 110.

Figure 1C:
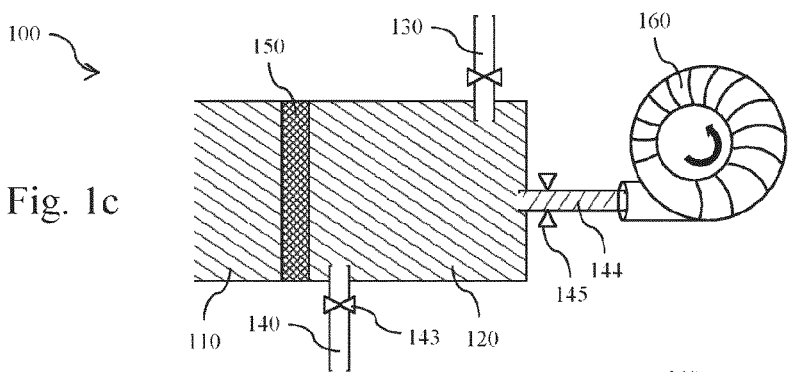
FIG. 1c schematically depicts the pressure chamber in a high pressure configuration, where due to osmotic transport of fluid across the membrane pressure within the pressure chamber builds and the pressure is used to perform work by driving a turbine.

Over time the transition is made between FIG. 1b and FIG. 1c, in which water from the supply chamber 110 is allowed to cross the membrane 150 into the pressure chamber 120, thereby reducing the solute concentration within the pressure chamber 120. Simultaneously, as more water crosses the membrane 150, the pressure within the pressure chamber 120 begins to climb. It is advantageous to have both the inlet 130 (e.g., the inflow port) and the outlet 140 (e.g., the outflow port) closed at this stage. The raised pressure within the pressure chamber 120 can then be used to perform work. Merely as an example, the at least one second outlet 144 (exemplified here by the secondary outlet port 144) is shown in FIGS. 1a to 1d, through which the liquid is allowed to exit the pressure chamber 120. One way to extract work from the high pressure within the motor is to utilize the high pressure flow through the at least one second outlet 144 (e.g., in secondary outlet port 144) to turn a turbine 160 as shown in FIG. 1c by the black arrow. Alternative methods for extracting work from the motor will also be discussed.

Figure 1D:
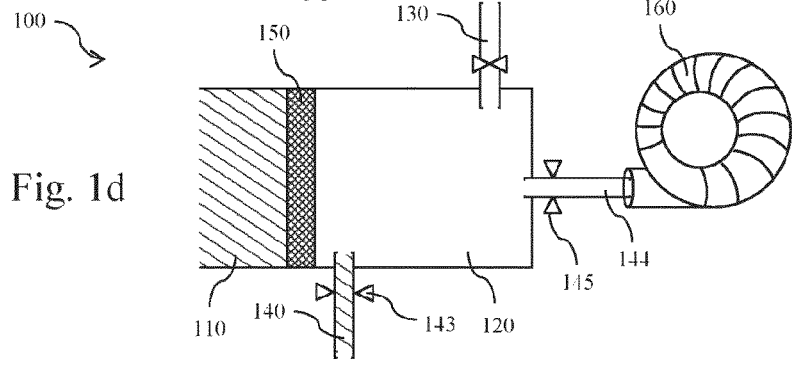
FIG. 1d schematically depicts the pressure chamber in a low pressure configuration as fluid is drained from the pressure chamber.

In FIG. 1d the outlet 140 (e.g., outflow port 140) has been opened allowing the fluid in the pressure chamber 120 to drain out. It may also be advantageous to seal the inlet 130 (e.g. inflow port 130) at this point to prevent unwanted build-up of liquid within the pressure chamber 120. Once the pressure within the pressure chamber 120 has reached an acceptably low level and the pressure chamber 120 is substantially empty, the outlet 140 (e.g., outflow port 140) can again be sealed and the process then begins again as in FIG. 1a.

Preferably, the build-up of pressure within the pressure chamber 120 is distinctly separate from the filling of the pressure chamber 120 with salt water. This is highly beneficial as the filling of the pressure chamber then does not take place against the pressure of a fluid in the pressure chamber 120. Generally, osmotic motors operate using constant fill and constant pressure to perform work continuously, such as by continuously turning a turbine. The present configuration of a two-step fill and pressure build-up process, however, allows for higher efficiency in work output.

In other words, it is preferred to fill the pressure chamber 120 (see FIG. 1b) while the pressure therein is lower than the pressure achieved during pressure build-up (see FIG. 1c). Preferably, the pressure chamber 120 is at least partially emptied for this purpose. For example, filling of the pressure chamber 120 may be performed (e.g., begin) when the pressure chamber 120 contains at least 30% less volume of high salt concentration fluid than during pressure build-up, at least 50% less volume of high salt concentration fluid than during pressure build-up, or at least 75% less volume of high salt concentration fluid than during pressure build-up. The pressure chamber 120 may be also be substantially empty of high salt concentration fluid (see FIG. 1a).

For example, during filling of the pressure chamber 120 (see FIG. 1b) after it has been at least partially emptied (see FIG. 1d), the pressure may be as low as 1 MPa or less, 100 kPa or less, or even 1.0 kPa or less. Meanwhile, a maximum pressure achieved within the pressure chamber 120 during pressure build-up by fluid crossing the membrane (see FIG. 1c) may be at least 0.3 MPa, at least 1.3 MPa, at least 3 MPa. or even at least 4 MPa.

The cycle of filling and emptying the pressure chamber 120 shown throughout FIGS. 1a to 1d may be performed at least 2 times per hour, more preferably at least 10 times per hour, more preferably at least 20 times per hour, and even more preferably at least 60 times per hour during generation of power by the motor 100. The at least one inlet 130 may be configured such that the pressure chamber 120 may be sufficiently replenished with new high salt concentration fluid quickly, e.g., within less than 3 minutes, less than 2 minutes, less than 1 minute, or even less than 0.5 minutes after it has been at least partially emptied (e.g., at least 30%, at least 50%, or at least 75% when compared to the volume of high salt concentration fluid during pressure build-up) or completely emptied.

As further shown in FIGS. 1a to 1d, the at least one second outlet 144 may comprise a valve 145. This valve 145 may also be referred to as a second pressure chamber outlet valve. The second pressure chamber outlet valve 145 valve may be opened to emit and/or drain fluid from the pressure chamber 120 once sufficient pressure has been built up. The flow emitted from the pressure chamber 120 through the second pressure chamber outlet valve 145 may then be used to perform work (e.g., via the turbine 160), see FIG. 1c. The second pressure chamber outlet valve 145 may be intermittently opened and closed, for example at least once during each filling and emptying cycle of the pressure chamber 120. In some examples, an intermittent opening/closing may comprise opening and closing the valve 145 more than once during each cycle, e.g. up to 10 or even 100 times.

The second pressure chamber outlet valve 145 may be configured to automatically open once a predetermined pressure in the pressure chamber 120 is reached. The valve may be fully mechanical for this purpose. Alternatively or additionally, one or more pressure sensors (not shown) may be provided within the pressure chamber 120 in order to measure whether the predetermined pressure is reached, upon which the valve may be opened (e.g., by an electrical control unit). The second pressure chamber outlet valve 145 may further be configured as a non-return valve in order to prevent backflow into the pressure chamber 120. e.g., from the turbine 160 and/or from an accumulator. Such accumulator is discussed with reference to FIG. 4 in more detail below, but the skilled reader will appreciate that it may also be employed in connection with the arrangement shown in FIGS. 1a to 1d and 3.

As shown in FIGS. 1a to 1d, the second pressure chamber outlet valve 145 may be closed during filling of the pressure chamber 120 (see FIG. 1b) and/or during the emptying of the pressure chamber 120 (see FIG. 1d).

While FIGS. 1a to 1d show the at least one first outlet 140 and the at least one second outlet 144 of the pressure chamber 120 being provided at two different locations, it will be appreciated that both the first and the second outlet could be provided via a common duct (e.g., via a common outflow port). Such configuration is shown in an exemplary manner in FIG. 3, but may also be used in connection with the arrangement shown in FIGS. 1a to 1d and 3.

FIG. 2 illustrates an alternative example of the method and motor. The motor 200 comprises a supply chamber 210, a pressure chamber 220, and a membrane 250 for separating fluid in the supply chamber 210 from fluid in the pressure chamber 220 but enabling exchange of at least one solute therebetween. The pressure chamber 220 is provided with an inlet 230 (exemplified here as an inflow port 230) and an outlet 240 (exemplified here as an inflow port 240).

Figure 2A:
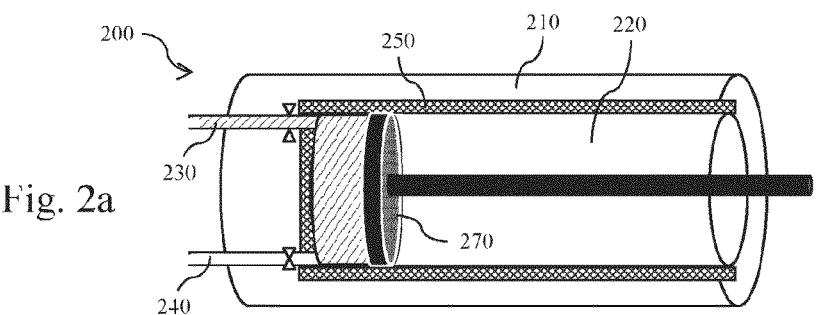

In FIG. 2a, high salt concentration fluid (e.g., salt water) is flowed into the pressure chamber 220 through the inlet 230 (e.g., through the inflow port). The outlet 240 (e.g., the outflow port) is closed and/or sealed. The supply chamber 210 as illustrated surrounds the pressure chamber 220 and is separated from the pressure chamber 220 by the osmotic membrane 250. However, the supply chamber 210 may alternatively be placed merely adjacent to the pressure chamber 220.

In this configuration the motor also comprises a piston 270 positioned within the pressure chamber 220 and being slidable therewithin. In the configuration of the motor 200 shown in FIG. 2a, the piston 270 is proximate to the inlet 230 as only a small volume of salt water is provided within the pressure chamber 220.

Figure 2B:
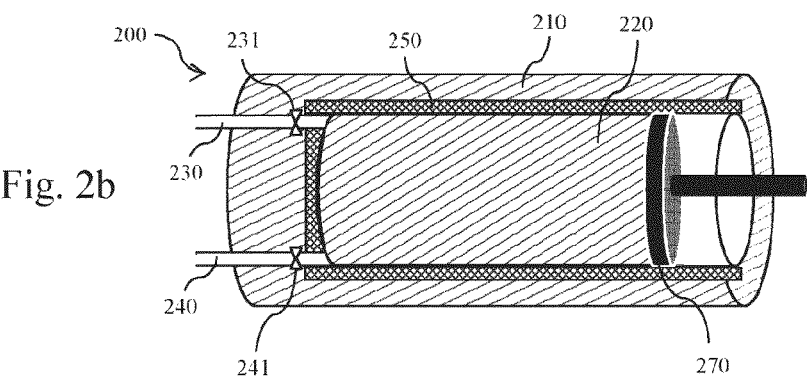
FIG. 2b schematically illustrates the pressure chamber of FIG. 2a being in a closed configuration wherein pressure buildup due to osmotic transport of fluid across the membrane drives the piston to move.

As shown in FIG. 2b, fresh water is flowed into the supply chamber 210 while the inlet 230 (e.g. inflow port) and the outlet 240 (e.g. outflow port) are reduced in flow capacity or completely sealed. Due to the osmotic gradient across the membrane 250, water flows from the supply chamber 210 into the pressure chamber 220 by traversing the osmotic membrane 250. As more water enters the pressure chamber 220, the pressure within the pressure chamber 220 rises. In contrast to the method shown in FIG. 1, the pressure chamber 220 has a variable volume in that the piston 270 may be moved by the liquid in the pressure chamber 220 in order to increase the volume within the pressure chamber 220.

In subsequent steps, which are analogous to those depicted in FIG. 1, the fluid within the pressure chamber 220 can subsequently be drained through the outlet 240 (e.g. outflow port) and the piston 270 can be returned to its initial position. The piston 270 may be moved in this circumstance either by being pulled along by a sudden drop in pressure within the pressure chamber 220, by being biased toward the initial configuration (e.g., by a spring and/or gravity), or through the momentum of a rotating element in connection with the piston 270 which drives the piston 270 forward again. The repeated motion of the piston 270 can therefore be used to perform work.

In this configuration the separation of pressure chamber 220 filling and the pressure build-up phases of the motor is performed, for example, by draining the supply chamber 210 before or while the pressure chamber 220 is filled. Thus, filling of the pressure chamber 220 is not performed against an existing pressure. The supply chamber 210 may be provided with one or more inlets and/or one or more outlets for filling and emptying the supply chamber 210 (not shown). The one or more supply chamber inlets and/or the one or more supply chamber outlets may each be provided with a respective valve (not shown).

As mentioned for the embodiment of FIGS. 1a to 1d above, it is preferred to fill the pressure chamber 220 (see FIG. 2a) while the pressure therein is lower than the pressure achieved during pressure build-up (see FIG. 2b). Preferably, the pressure chamber 220 is at least partially emptied for this purpose. For example, filling of the pressure chamber 220 may be performed (e.g., begin) when the pressure chamber 220 contains at least 30% less volume of high salt concentration fluid than during pressure build-up, at least 50% less volume of high salt concentration fluid than during pressure build-up, or at least 75% less volume of high salt concentration fluid than during pressure build-up. The pressure chamber 220 may be also be substantially empty of high salt concentration fluid.

For example, during filling of the pressure chamber 220 (see FIG. 2a) after it has been at least partially emptied, the pressure may be as low as 1 MPa or less, 100 kPa or less, or even 1.0 kPa or less. Meanwhile, a maximum pressure achieved within the pressure chamber 120 during pressure build-up by fluid crossing the membrane (see FIG. 2b) may be at least 0.3 MPa, at least 1.3 MPa, at least 3 MPa, or even at least 4 MPa.

As further mentioned above, the cycle of filling and emptying the pressure chamber 220 may be performed at least 2 times per hour, more preferably at least 10 times per hour, more preferably at least 20 times per hour, and even more preferably at least 60 times per hour during operation of the motor 200 (e.g., during generation of power). The at least one inlet 230 may be configured such that the pressure chamber 220 may be sufficiently replenished with new high salt concentration fluid quickly. e.g., within less than 3 minutes, less than 2 minutes, less than 1 minute, or even less than 0.5 minutes after it has been at least partially emptied (e.g., at least 30%, at least 50%, or at least 75% when compared to the volume of high salt concentration fluid during pressure build-up) or completely emptied.

Turning back to FIGS. 2a and 2b, it is shown that the inlet 230 may be provided with a pressure chamber inlet valve 231. The pressure chamber inlet valve 231 may be opened for filling the pressure chamber 230 (see FIG. 2a). The pressure chamber inlet valve 231 may be closed and/or sealed during pressure build up (see FIG. 2b). As such, the pressure chamber inlet valve 231 may be intermittently opened and closed during generation of power by the motor 200, e.g. at least 2 times per hour, more preferably at least 10 times per hour, more preferably at least 20 times per hour, and even more preferably at least 60 times per hour.

The outlet 240 may be provided with a pressure chamber outlet valve 241. The pressure chamber outlet valve 241 may be closed and/or sealed during filling of the pressure chamber 230 (see FIG. 2a). The pressure chamber outlet valve 241 may be closed and/or sealed during pressure build up in the pressure chamber 230 (see FIG. 2b). The pressure chamber outlet valve 241 may be opened during emptying of the pressure chamber 220 (not shown). As such, the pressure chamber outlet valve 241 may be intermittently opened and closed during generation of power by the motor 200, e.g. at least 2 times per hour, more preferably at least 10 times per hour, more preferably at least 20 times per hour, and even more preferably at least 60 times per hour. The pressure chamber outlet valve 241 may be closed when the pressure chamber inlet valve 231 is opened, in particular during filling of the pressure chamber 220.

Figure 3:
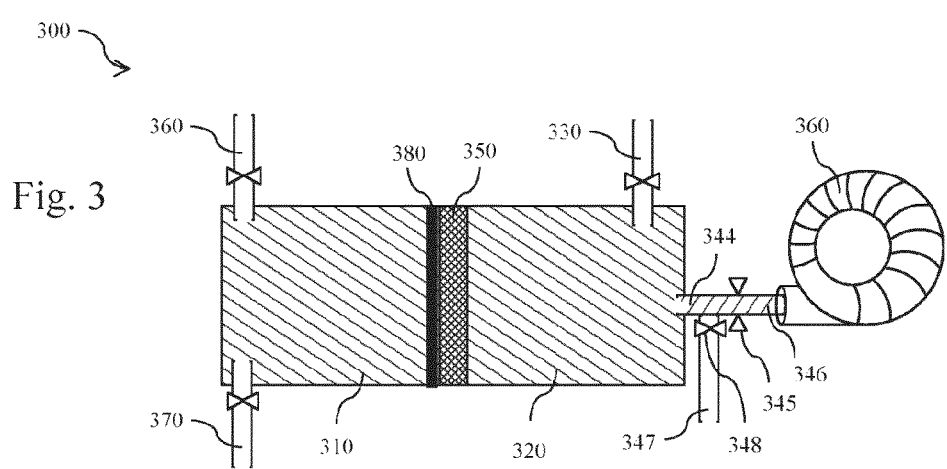
FIG. 3 schematically illustrates another configuration of the motor, wherein the motor further comprises an osmotic barrier and wherein the supply chamber comprises inlet and outlet valves.

FIG. 3 illustrates another example configuration of a motor 300 with a supply chamber 310, a pressure chamber 320, and a membrane 350. The pressure chamber 320 is provided with an inlet 330 (exemplified here as an inflow port 330) and an outlet 344 (exemplified here as an outlet port 344).

As shown in FIG. 3, the supply chamber 310 may further be provided with an inlet 360 (exemplified as an inflow port 360) and an outlet 370 (exemplified as an outflow port 370). As has been previously mentioned, the supply chamber 310 may operate in either a constant flow capacity, wherein a supply of low salt concentration fluid is continuously flowed into the supply chamber 310, or in step-wise manner, wherein low salt concentration fluid is flowed in, stored for the pressure build-up phase of the pressure chamber, and then replenished for another cycle. It will be appreciated that this concept is equally applicable to the embodiments previously described. Therefore, also the supply chambers 110 and 220 may be provided with such an inlet and/or such an outlet.

In the configuration shown in FIG. 3, the motor 300 also comprises an osmotic barrier 380, which is reversibly positionable between the supply chamber 310 and the pressure chamber 320. The osmotic barrier 380 may be positioned on either side of the membrane 350 or even within portions of the membrane 350. Importantly, the osmotic barrier 380 halts or substantially reduces the flow of liquid from the supply chamber 310 to the pressure chamber 320. In this sense, an osmotic barrier 380 may be particularly advantageous when a constant flow of low salt concentration fluid is provided in the supply chamber 310, as this would prevent undesired transmission of fluids across the membrane 350 during non-pressure build up steps of the motor 300. However, such osmotic barrier 380 may be provided in any of the motors discussed herein, also those described with reference to FIGS. 1, 2 and 4.

As also depicted in FIG. 3, the outlet port 344 may be combined with and/or include an overpressure and/or non-return valve 345. The overpressure and/or non-return valve 345 has a set pressure value upon which it opens and allows fluid to pass through to perform work. In this example a turbine 360 is depicted but any analogous system may be used for performing work. Any such system for performing work may also be combined with an accumulator, as described hereinafter.

As shown in FIG. 3 the outlet 344 may provide a first outlet 346 towards turbine 360 and a second outlet 347, which may be provided as an additional exit. The second outlet 347 may be formed by or provided with a valve 348 or any equivalent. The second outlet 347 allows to drain fluid from the pressure chamber 320 that is not intended to be used for performing work. In other words, fluid draining from the pressure chamber 320 via the second outlet 347 bypasses work harvesting and power generation (e.g., bypasses the turbine 360).

Furthermore depicted in FIG. 3 is the outlet 370 (exemplified here by outflow port 370) which allows to drain the fresh water. As the fresh water may contain a low concentration of salt and just the water part is diffusing through the membrane the salt concentration is rising in the fresh water during operation and therefore it might be necessary to reduce the salt content of the fresh water in the supply chamber 310 by draining the water from time to time.

Figure 4:
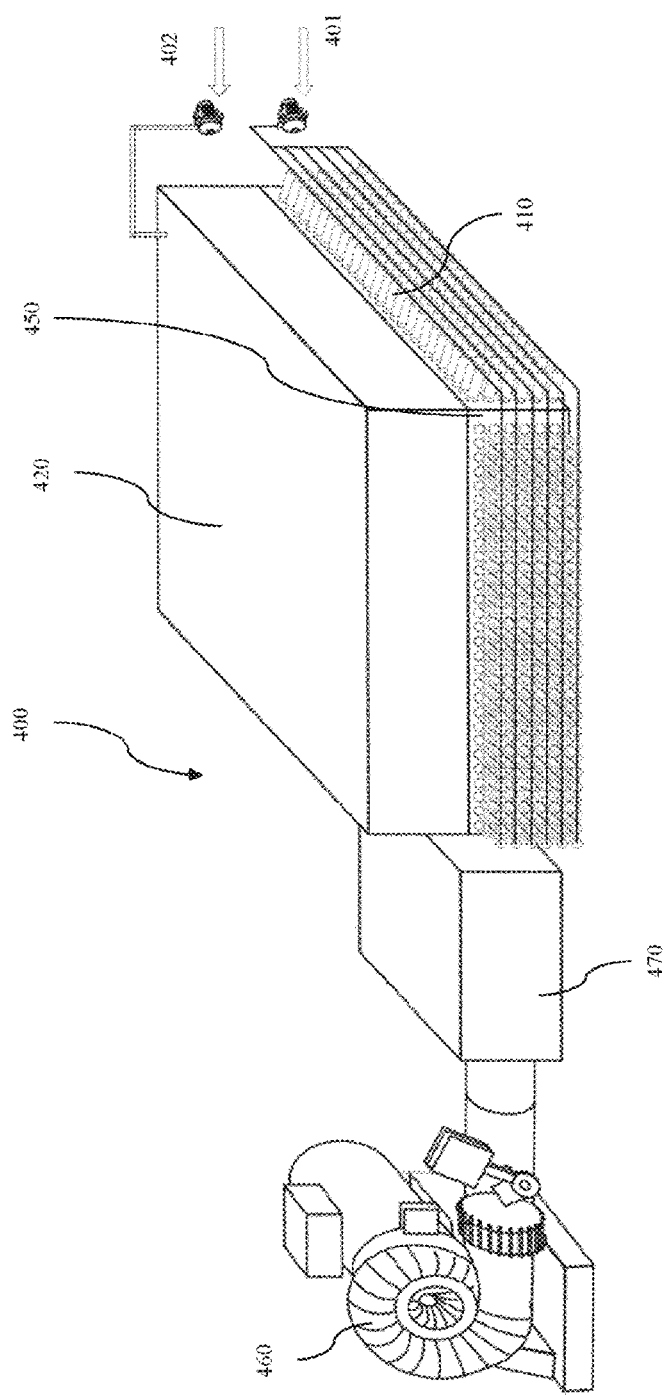
FIG. 4 provides an example configuration of the osmotic motor.

FIG. 4 demonstrates a further example of an osmotic motor 400. Therein an osmotic membrane element and the fresh water supply chamber may be formed as one unit, which is indicated with reference numeral 410 in FIG. 4. Examples of such commercially available units are FilmTec™ SW30 membranes from DuPont de Nemours, Inc. in combination with an appropriate holder.

The pressure chamber 450, also known as the salt water reservoir, holds the higher salt concentration water. Osmosis then takes place across each osmotic membrane element which is located in between the respective supply chamber and the pressure chamber 450. The fresh water is supplied at 401. The salt water is supplied at 402. The salt water may be supplied into a salt water reservoir 420 for instant replenishment of the salt water in the pressure chamber 450. The salt water reservoir 420 may be located above the pressure chamber 450.

As further shown in FIG. 4, any of the motors described herein may further include an accumulator 470 which is placed in the flow path between the pressure chamber 450 and the generator 460 (e.g., a turbine). The accumulator 470 serves to build up and maintain a certain level of pressure in the outflow from the pressure chamber 420 (i.e., in the flow supplied to the generator 460). In some cases the accumulator 470 may aid in providing adequate flow pressure to the generator 460 such that it may continue performing work even in between pressure build-up phases within the pressure chamber 450.

The accumulator 470 is, in particular, at least one hydraulic accumulator. The accumulator 470 is interposed between the pressure chamber 450 and the turbine and/or generator 460.

Another potentially useful configuration of any of the motors discussed herein is to provide the liquid outlet such that liquid leaving the pressure chamber 120, 220, 320, 450 is aided in the flow direction by gravity. In this way, not only the phase of performing work, but additionally the draining of the pressure chamber 120, 220, 320, 450 may be performed with greater energy efficiency.

In addition to having a single pressure chamber 120, 220, 320, 450, as with the examples described above, the motor/system may also comprise a plurality of pressure chambers 120, 220, 320, 450, which may be operatively connected to the one or more supply chambers via the one osmotic membrane or several or a corresponding number of osmotic membrane elements.

For example, the plurality of pressure chambers enables an operation mode in which every few seconds a new cycle starts.

It is also an aspect of the present invention that the system comprises a plurality of turbines and/or generators 460. For example, the number of turbines/generators 460 that produce current, may be varied according to the demand for current.

The method described above may be adapted to the motor with a plurality of pressure chambers 120, 220, 320, 450. For example, the method steps described herein may be applied to any of the plurality of pressure chambers 120, 220, 320, 450, alone or in parallel with other pressure chambers 120, 220, 320, 450 of the plurality of pressure chambers 120, 220, 320, 450. If the method steps are applied to several pressure chambers 120, 220, 320, 450, the method steps applied to one pressure chamber 120, 220, 320, 450 may be shifted in time as compared to one or several or all other pressure chambers 120, 220, 320, 450.

While a wide range of osmotic membranes are commercially available, the selection of the membrane may influence the efficiency and cost of providing the inventive osmotic motor. Generally, it is advantageous to provide an osmotic membrane which provides a stabilized salt rejection of at least 95%. For greater efficiency, a stabilized salt rejection of at least 98%, or even more preferably at least 99% is preferred. The values for stabilized salt rejection are measured when the osmotic membrane is subjected to a test salt concentration of 32,000 mg/L NaCl at 25° C. with an applied pressure of 5.5 MPa, and with 10% recovery. However, it is acknowledged that with increasing quality of the osmotic membrane, greater costs may be incurred, thus it is foreseen that the ultimate selection of the osmotic membrane is based on the specific requirements of the osmotic motor.

Another important aspect of providing energy utilizing one of the osmotic motors as described are the relative pressures utilized during different phases of operation. In the closed configuration, wherein pressure is built up within the pressure chamber 450, the pressure chamber 450 may be configured to operate with a pressure achieved being at least 1 MPa (gauge), preferably at least 2 MPa (gauge), more preferably at least 2.3 MPa (gauge). This pressure may be referred to as the maximum pressure achieved by the system. Greater maximum pressure within the pressure chamber 450 allows for a larger extraction of work from the system.

In contrast, in the open configuration, wherein pressure within the pressure chamber 450 is reduced and the pressure chamber 450 may be drained may achieve a pressure within the pressure chamber being at most 1 MPa (gauge), preferably at most 100 kPa (gauge), more preferably at most 1.0 kPa (gauge). This pressure may be referred to as the minimum pressure achieved by the system. It is also envisioned that in the open configuration of operation the pressure within the pressure chamber 450 may be substantially equal to local atmospheric pressure.

The osmotic motors described above are envisioned to provide at least 100 Watts of energy, preferably at least 1 Kilowatt, and more preferably at least 1 Megawatt. Due to the ease of setup and ample availability of fresh water/salt water mixing locations, multiple osmotic motor systems may be positioned together and operated either in parallel or alternating, such that continuous energy generation is performed.

While the invention has been illustrated and described in detail in the drawings and foregoing description, such illustration and description are to be considered illustrative or exemplary and non-restrictive; the invention is thus not limited to the disclosed embodiments. Variations to the disclosed embodiments can be understood and effected by those skilled in the art and practicing the described invention, from a study of the drawings, the disclosure, and the appended claims. In the aspects and claims, the word "comprising" does not exclude other elements or steps, and the indefinite article "a" or "an" does not exclude a plurality and may mean "at least one".

As far as reference is made to a "closing" or "sealing" of an inlet or outlet herein, a fluid tight closing is generally preferred. It should be noted, however, that a (partial) closing providing a sufficient restriction of flow through the respective inlet or outlet may be sufficient for achieving the effects described therein in some cases. Therefore, also a partial sealing or closing may be encompassed.

The following are preferred aspects of the invention:

1. A method for performing work using osmosis comprising the steps of
   i) providing a motor comprising a supply chamber, a pressure chamber comprising at least one inlet (e.g., an inflow port) and at least one outlet (e.g., an outflow port), and a membrane permeable to fluid, preferably water, and at least partially impermeable to salt ions, the membrane enabling fluid communication between the supply chamber and the pressure chamber;
   ii) providing low salt concentration fluid, preferably low salt concentration water, in the supply chamber;
   iii) closing and/or sealing the outlet of the pressure chamber,
   iv) flowing high salt concentration fluid, preferably high salt concentration water, into the pressure chamber,
   v) allowing the pressure within the pressure chamber to increase as fluid crosses the membrane into the pressure chamber;
   vi) using the increased pressure within the pressure chamber to perform work;
   vii) opening the outlet of the pressure chamber and allowing the fluid to drain from the pressure chamber and the pressure in the pressure chamber to decrease;
   viii) repeating steps iii-vii.

2. The method according to aspect 1, wherein the pressure chamber has a fixed volume and wherein the motor further comprises a turbine, wherein step vi comprises fluid flowing out from the pressure chamber due to increased pressure and operating the turbine to perform work.

3. The method according to aspect 1, wherein the pressure chamber has a variable volume.

4. The method according to aspect 3, wherein the pressure chamber further comprises a piston, wherein movement of the piston due to increased pressure within the pressure chamber performs work.

5. The method according to any one of the previous aspects, wherein the outlet further comprises a valve, wherein the method further comprises the step of
   opening the valve to relieve at least a portion of the pressure within the pressure chamber, wherein flow of fluid emitted from the valve is used to perform work.

6. The method according to aspect 14, wherein the valve is an overpressure and/or a non-return valve.

7. The method according to any one of the previous aspects, wherein the motor further comprises an osmotic barrier configured to reversibly block the exchange of fluid between the supply chamber and the pressure chamber and the method further comprising the steps of
    positioning the osmotic barrier over the membrane such that fluid flow between the supply chamber the pressure chamber is prevented; and
    removing the osmotic barrier after using the increased pressure to perform work.

8. The method according to any one of the previous aspects, wherein during filling of the pressure chamber a maximum pressure achieved within the pressure chamber is at least 3 MPa, preferably at least 5 MPa, and more preferably at least 7 MPa.

9. The method according to any one of the previous aspects, wherein flowing low salt concentration fluid into the supply chamber is performed while the pressure chamber is either empty or at a pressure lower than 1 MPa, preferably lower than 100 kPa, more preferably lower than 1.0 kPa.

10. The method according to any one of the previous aspects, further comprising the step of
    sealing the inlet of the pressure chamber after flowing high salt concentration fluid into the pressure chamber.

11. The method according to any one of the previous aspects, wherein the low salt concentration fluid has a salt concentration below 5 parts per thousand, preferably below 1 part per thousand, more preferably below 0.5 parts per thousand.

12. The method according to any one of the previous aspects, wherein the high salt concentration fluid has a salt concentration above 5 parts per thousand, preferably above 20 parts per thousand, more preferably above 30 parts per thousand.

13. The method according to any one of the previous aspects, wherein the high salt concentration fluid has a salt concentration at least 100× higher than the low salt concentration fluid, preferably at least 500× higher, and more preferably at least 1000× higher.

14. The method according to any one of the previous aspects, wherein a naturally occurring current or pressure is employed for flowing the low salt concentration fluid into the supply chamber and/or the high salt concentration fluid into the pressure chamber.

15. The method according to any one of the previous aspects, wherein the low salt concentration fluid flows into the supply chamber by gravity and/or wherein the high salt concentration fluid flows into the pressure chamber by gravity.

16. The method according to any one of the previous aspects, wherein the fluid is drained from the pressure chamber by gravity.

17. The method according to any one of the previous aspects, wherein the high salt concentration fluid is seawater, preferably wherein the motor is installed at the estuary of a river.

18. The method according to any one of the previous aspects, wherein the high salt concentration fluid is wastewater or brine, wherein the brine preferably results from a desalination process, such as reverse osmosis, or a condensation process.

19. The method according to any one of the previous aspects, wherein the low salt concentration fluid is seawater.

20. The method according to any one of the previous aspects, wherein the pressure in the pressure chamber decreases as the fluid from the pressure chamber is drained.

21. The method according to any one of the previous aspects, wherein the pressure in the pressure chamber decreases as work is performed.

22. A motor comprising:
    a supply chamber configured to receive a supply of low salt concentration fluid, preferably low salt concentration water.
    a pressure chamber configured to receive a supply of high salt concentration fluid, preferably high salt concentration water, the pressure chamber further comprising an inlet (e.g., an inflow port) and a sealable and/or closeable outlet (e.g., an outflow port);
    a membrane permeable to fluid molecules and at least partially impermeable to salt ions, the membrane enabling fluid communication between the supply chamber and the pressure chamber,
    wherein the pressure chamber is configured to alternate between a closed configuration, wherein the outlet is sealed and pressure builds within the pressure chamber, and an open configuration, in which the outlet is open and pressure within the pressure chamber reduces.

23. The motor of aspect 22, wherein the pressure chamber has a fixed volume and wherein the motor further comprises a turbine in fluid connection with the pressure chamber.

24. The motor of aspect 22, wherein the pressure chamber has a variable volume, preferably wherein the pressure chamber further comprises an expansion portion configured to allow the pressure chamber to reversibly increase in volume.

25. The motor of aspect 24, wherein the expansion portion is a piston.

26. The motor of any one of aspects 22 to 25, further comprising an osmotic barrier configured to reversibly block the exchange of fluid between the supply chamber and the pressure chamber through the membrane.

27. The motor of any one of aspects 22 to 26, wherein the pressure chamber further comprises a valve configured to release fluid from the pressure chamber, preferably wherein the valve is an overpressure valve.

28. The motor of any one of aspects 22 to 27, wherein the membrane provides a stabilized salt rejection of at least 95%, more preferably at least 98%, and even more preferably at least 99% when subjected to a test salt concentration of 32,000 mg/L NaCl at 25° C. with an applied pressure of 5.5 MPa, and with 10% recovery.

29. The motor of any one of aspects 22 to 28, wherein the supply chamber further comprises an inlet (e.g., an inlet port) and an outlet (e.g., an outlet port), preferably wherein the inlet and/or the outlet is closeable and/or sealable.

30. The motor of any one of aspects 22 to 29, wherein the motor is configured to provide at least 0.1 Watts of energy, preferably at least 0.5 Watts, and more preferably at least 1 Watt.

31. The motor of any one of aspects 22 to 30, wherein in the closed configuration a maximum pressure achieved within the pressure chamber being at least 1 MPa, preferably at least 2 MPa, more preferably at least 2.3 MPa.

32. The motor of any one of aspects 22 to 31, wherein in the open configuration a minimum pressure achieved within the pressure chamber being at most 1 MPa, preferably at most 100 kPa, more preferably at most 1.0 kPa.

The invention claimed is:

1. A method for performing work using osmosis comprising the steps of:
   i) providing a motor comprising a supply chamber, a pressure chamber, and a membrane permeable to fluid and at least partially impermeable to salt ions, the pressure chamber comprising at least one inlet, at least one outlet, and a total internal volume, and the membrane enabling fluid communication between the supply chamber and the pressure chamber;
   ii) providing low salt concentration fluid in the supply chamber;
   iii) closing the at least one outlet of the pressure chamber;
   iv) flowing high salt concentration fluid into the pressure chamber;
   v) allowing a pressure within the pressure chamber to increase as fluid crosses the membrane into the pressure chamber, each inlet of the at least one inlet and each outlet of the at least one outlet being closed thereby fixing the total internal volume of the pressure chamber;
   vi) opening at least one of the at least one outlet of the pressure chamber and allowing the fluid to drain from the pressure chamber and the pressure in the pressure chamber to decrease;
   vii) using the increased pressure from within the pressure chamber to perform work; and
   viii) repeating steps iii to vii.

2. The method according to claim 1, wherein a pressure achieved within the pressure chamber is at least 1 MPa while the at least one inlet and the at least one outlet are closed.

3. The method according to claim 1, wherein a pressure achieved within the pressure chamber is at least 2 MPa.

4. The method according to claim 1, wherein the pressure in the pressure chamber alternates between a lower pressure for flowing high salt concentration fluid into the pressure chamber in step iv and a higher pressure for performing work.

5. The method according to claim 1, wherein flowing high salt concentration fluid into the pressure chamber in step iv is performed while the pressure chamber is at a pressure lower than 1 MPa (gauge).

6. The method according to claim 1, wherein flowing high salt concentration fluid into the pressure chamber in step iv is performed while the pressure chamber is at a pressure lower than 100 kPa (gauge).

7. The method according to claim 1, wherein flowing high salt concentration fluid into the pressure chamber in step iv is performed while the pressure chamber is at a pressure lower than 1.0 kPa (gauge).

8. The method according to claim 1, wherein flowing high salt concentration fluid into the pressure chamber in step iv is performed while the pressure in the pressure chamber is at least 25% lower than a maximum pressure achieved in step v.

9. The method according to claim 1, wherein also step ii is repeatedly performed, and wherein providing low salt concentration fluid into the supply chamber in step ii is performed while the pressure chamber is either empty or at a pressure lower than 1 MPa (gauge).

10. The method according to claim 1, wherein also step ii is repeatedly performed, and wherein providing low salt concentration fluid into the supply chamber in step ii is performed while the pressure chamber is either empty or at a pressure lower than 100 kPa (gauge).

11. The method according to claim 1, wherein also step ii is repeatedly performed, and wherein providing low salt concentration fluid into the supply chamber in step ii is performed while the pressure chamber is either empty or at a pressure lower than 1.0 kPa (gauge).

12. The method according to claim 1, wherein a maximum pressure achieved within the pressure chamber is at least 10% lower than a maximum theoretical osmotic pressure of the system.

13. The method according to claim 1, wherein steps iv), v), vi), and vii) are performed sequentially and in this order.

14. The method according to claim 1, wherein the motor further comprises a turbine, wherein step vii comprises fluid flowing out from the pressure chamber due to increased pressure and operating the turbine to perform work.

15. The method according to claim 14, wherein the at least one outlet further comprises a valve, wherein the valve is intermittently opened to relieve at least a portion of the pressure generated within the pressure chamber in step v, wherein an intermittent flow of fluid emitted from the valve is used to perform work in the turbine.

16. The method according to claim 1, wherein the motor further comprises an accumulator, wherein the accumulator receives an intermittent flow from the pressure chamber.

17. The method according to claim 1, wherein the motor further comprises an osmotic barrier configured to reversibly block an exchange of fluid between the supply chamber and the pressure chamber and the method further comprising the steps of:
   positioning the osmotic barrier over the membrane such that fluid flow between the supply chamber and the pressure chamber is prevented; and
   removing the osmotic barrier after using the increased pressure to perform work.

18. The method according to claim 1, wherein the high salt concentration fluid has a salt concentration at least 100× higher than the low salt concentration fluid.

19. The method according to claim 1, wherein the low salt concentration fluid flows into the supply chamber by gravity.

20. The method according to claim 1, wherein the high salt concentration fluid flows into the pressure chamber by gravity.

21. The method according to claim 1, wherein fluid is drained from the pressure chamber by gravity.

22. A motor comprising:
   a supply chamber configured to receive a supply of low salt concentration fluid;
   a pressure chamber configured to receive a supply of high salt concentration fluid, the pressure chamber further comprising a sealable inlet, a sealable outlet, and a total internal volume; and
   a membrane permeable to fluid molecules and at least partially impermeable to salt ions, the membrane enabling fluid communication between the supply chamber and the pressure chamber,
   wherein the motor is configured to:
   i) provide the supply chamber with the low salt concentration fluid;
   ii) close the sealable outlet of the pressure chamber creating a closed configuration;
   iii) flow the high salt concentration fluid into the pressure chamber;
   iv) increase a pressure within the pressure chamber as fluid crosses the membrane into the pressure chamber by closing each of the sealable inlet and the sealable outlet and thereby fixing the total internal volume of the pressure chamber;
   v) open the sealable outlet of the pressure chamber creating an open configuration allowing the fluid to drain from the pressure chamber and the pressure in the pressure chamber to decrease;
vi) perform work using the increased pressure from within the pressure chamber; and
vii) repeat steps ii to vi.

23. The motor of claim 22, wherein the inlet is closed during the closed configuration.

24. The motor of claim 22, wherein flowing high salt concentration fluid into the pressure chamber is repeatedly performed during operation of the motor while the pressure chamber is at a pressure lower than 1 MPa (gauge).

25. The motor of claim 22, wherein flowing high salt concentration fluid into the pressure chamber is repeatedly performed during operation of the motor while the pressure chamber is at a pressure lower than 100 kPa (gauge).

26. The motor of claim 22, wherein flowing high salt concentration fluid into the pressure chamber is repeatedly performed during operation of the motor while the pressure chamber is at a pressure lower than 1.0 kPa (gauge).

27. The motor of claim 22, wherein flowing high salt concentration fluid into the pressure chamber is repeatedly performed during operation of the motor while a pressure in the pressure chamber is at least 50% lower than a maximum pressure build up during the closed configuration.

28. The motor of claim 22, wherein the motor further comprises an accumulator, wherein the accumulator receives an intermittent flow from the pressure chamber.

29. The motor according to claim 28 wherein the motor further comprises a turbine in fluid connection with the pressure chamber and wherein the accumulator is placed between the pressure chamber and the turbine.

30. The motor according to claim 22, wherein the motor further comprises a turbine in fluid connection with the pressure chamber.

31. The motor according to claim 22, further comprising an osmotic barrier configured to reversibly block the exchange of fluid between the supply chamber and the pressure chamber through the membrane.

32. The motor according to claim 22, wherein the pressure chamber further comprises a valve configured to release fluid from the pressure chamber.

33. The motor according to claim 22, wherein the membrane provides a stabilized salt rejection of at least 95% when subjected to a test salt concentration of 32,000 mg/L NaCl at 25° C. with an applied pressure of 5.5 MPa, and with 10% recovery.

* * * * *